United States Patent
Xynkin et al.

(10) Patent No.: US 10,102,432 B2
(45) Date of Patent: Oct. 16, 2018

(54) IMAGE RECOGNITION METHOD

(71) Applicant: INDUSTRIAL TECHNOLOGY RESEARCH INSTITUTE, Hsinchu (TW)

(72) Inventors: Denis Xynkin, Hsinchu County (TW); Min-Hao Li, Taoyuan County (TW); Yi-Yi Huang, Taipei (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 39 days.

(21) Appl. No.: 15/374,347

(22) Filed: Dec. 9, 2016

(65) Prior Publication Data

US 2017/0169298 A1    Jun. 15, 2017

(30) Foreign Application Priority Data

Dec. 10, 2015   (TW) .............................. 104141569 A (51) Int. Cl.
*G06K 9/00* (2006.01)
*G06K 9/46* (2006.01)
*G06K 9/62* (2006.01)

(52) U.S. Cl.
CPC ....... *G06K 9/00771* (2013.01); *G06K 9/4642* (2013.01); *G06K 9/6212* (2013.01); *G06K 9/6298* (2013.01)

(58) Field of Classification Search
CPC . G06T 2207/10016; G06T 2207/20216; G06T 7/136; G06K 9/00771;

(Continued)

(56) References Cited

U.S. PATENT DOCUMENTS 6,493,041 B1   12/2002  Hanko
7,623,152 B1*  11/2009  Kaplinsky ............... G06T 7/254
                                                        348/155

(Continued)

FOREIGN PATENT DOCUMENTS

CN         1304119 A      7/2001
CN       103729862 A1     4/2014

(Continued)

OTHER PUBLICATIONS

"An Advanced Motion Detection Algorithm With Video Quality Analysis for Video Surveillance Systems" Shih-Chia Huang in IEEE 2011, p. 1-14 (Jan. 2011).

(Continued)

*Primary Examiner* — Jingge Wu
(74) *Attorney, Agent, or Firm* — Maschoff Brennan (57) ABSTRACT

Disclosed is an image recognition method including: producing a distribution of first pixel value range by acquiring a distribution of pixel values of a plurality of pixels of a first selected block in a first surveillance image from previous M images; producing a distribution of second pixel value range by acquiring a distribution of pixel values of the pixels of the first selected block from previous N images, wherein N and M are positive integers, and N<M; obtaining a first varying parameter related to the first selected block according to the distribution of first pixel value range and the distribution of second pixel value range; and generating a first recognition signal when the first varying parameter is greater than a first threshold.

10 Claims, 8 Drawing Sheets

(58) Field of Classification Search
CPC ............ G06K 9/00369; G06K 9/4642; G06K 9/6202; G06K 9/00335; G06K 9/34; G06K 9/6212

See application file for complete search history.

(56) References Cited

U.S. PATENT DOCUMENTS

| | | | |
|---|---|---|---|
| 8,077,926 | B2 | 10/2011 | Chen |
| 8,285,046 | B2 | 10/2012 | Cobb |
| 8,649,594 | B1 | 2/2014 | Hua |
| 8,711,217 | B2 | 4/2014 | Venetianer |
| 2002/0180870 | A1* | 12/2002 | Chen ............... H04N 5/144 348/207.1 |
| 2005/0163346 | A1* | 7/2005 | van den Bergen .......... G06K 9/00771 382/103 |
| 2007/0047811 | A1 | 3/2007 | Itoh |
| 2007/0273765 | A1* | 11/2007 | Wang ............... G06K 9/00771 348/152 |
| 2008/0030579 | A1* | 2/2008 | Kelly, III .......... G06K 9/00771 348/154 |
| 2008/0100704 | A1 | 5/2008 | Venetianer et al. |
| 2008/0199051 | A1 | 8/2008 | Seo |
| 2009/0110299 | A1* | 4/2009 | Panahpour Tehrani ............... G06T 7/277 382/224 |
| 2010/0215256 | A1* | 8/2010 | Wang ............... G06K 9/34 382/159 |
| 2010/0296698 | A1* | 11/2010 | Lien ............... G06T 7/20 382/103 |
| 2012/0183177 | A1* | 7/2012 | Ku ............... G06K 9/00771 382/103 |
| 2012/0201468 | A1* | 8/2012 | Oami ............... G06K 9/00362 382/199 |
| 2013/0044964 | A1* | 2/2013 | Ogura ............... G08B 29/046 382/260 |
| 2013/0051613 | A1* | 2/2013 | Bobbitt ............... G06K 9/00771 382/103 |
| 2014/0119602 | A1* | 5/2014 | Zuo ............... G06T 7/2033 382/103 |
| 2014/0198257 | A1* | 7/2014 | Gagvani ............ G06K 9/00543 348/700 |
| 2015/0003675 | A1* | 1/2015 | Nakagami .......... G06K 9/00523 382/103 |
| 2015/0227784 | A1* | 8/2015 | Roy ............... G06K 9/00771 382/103 |
| 2015/0363649 | A1* | 12/2015 | Zhao ............... G06K 9/00771 382/103 |

FOREIGN PATENT DOCUMENTS

| | | |
|---|---|---|
| TW | 476221 B | 2/2002 |
| TW | 200530955 A | 9/2005 |
| TW | 200713141 A | 4/2007 |
| TW | M316455 U | 8/2007 |
| TW | 200806035 A | 1/2008 |
| TW | 200841714 A | 10/2008 |
| WO | 2013182105 A1 | 7/2013 |

OTHER PUBLICATIONS

"Environmentally Robust Motion Detection for Video Surveillance" Hyenkyun Woo, Yoon Mo Jung, Jeong-Gyoo Kim, Jin Keun Seo in IEEE 2010, p. 2838-2848 (Nov. 2010).

"Motion Detection Based on Two-Piece Linear Approximation for Cumulative Histograms of Ratio Images in Intelligent Transportation Systems" Quen-Zong Wu,Hsu-Yung Cheng,Kuc-Chin Fan, IEEE 2004, p. 309-314 (2004).

"Motion detection for video surveillance" Sharma Neeraj, Sibbal Vicky in IEEE 2014, p. 578-584 (2014).

"Moving target classification and tracking from real-time video", Alan J. Lipton,Hironobu Fujiyoshi,Raju S. Petit; IEEE 1998; p. 8-14 (1998).

"Real-time abnormal motion detection in surveillance video" Kiryati, Nahum; Raviv, Tammy Riklin; Ivanchenko, Yan; Rochel, Shay; IEEE 2008, p. 1-4 (2008).

Taiwanese Office Action issued for corresponding application No. TW 104141569, dated Aug. 11, 2016.

\* cited by examiner

IMAGE RECOGNITION METHOD

CROSS-REFERENCE TO RELATED APPLICATIONS

This non-provisional application claims priority under 35 U.S.C. § 119(a) on Patent Application No(s). 104141569 filed in Taiwan, R.O.C. on Dec. 10, 2015, the entire contents of which are hereby incorporated by reference.

TECHNICAL FIELD

The disclosure relates to an image recognition method.

BACKGROUND

Surveillance devices have generally been applied to various environments having safety considerations. These conventional surveillance devices only send images they captured to so-called safety control centers, and then security guards or professionals will determine whether the captured images show the occurrence of an abnormal event. Because of the finite human ability of judgment, the above method usually requires that every 9 to 16 surveillance devices need a security guard or a professional so that the labor cost is relatively high.

Recently, with the advance of the image recognition technology, smart surveillance devices are developed to determine, by image recognition, whether any people appear on the screen. When a human appears on the screen, a relevant warning is triggered. Therefore, a professional or security guard can monitor more surveillance devices as compared to conventional technologies in the art. However, image recognition needs a great deal of computation for each image stream processing, so each corresponding surveillance device needs to receive sufficient power supply if image recognition is performed at a surveillance device (camera) end. Even if the captured image stream is sent to the control center for image recognition, a respective surveillance device needs to be connected to a network or a signal transmission cable for the momentary transmission of image streams, and also needs to be connected to electricity supply to meet its power requirements.

Considering power requirements is an important aspect in actual applications and in some cases a surveillance system has to be placed in Off-the-Grid areas, there will be a need to develop a smart surveillance device with low power consumption.

SUMMARY

According to one or more embodiments, the disclosure provides an image recognition method including: producing a distribution of first pixel value range by acquiring a distribution of pixel values of a plurality of pixels of a first selected block in a first surveillance image from previous M images; producing a distribution of second pixel value range by acquiring a distribution of pixel values of the pixels of the first selected block from previous N images, wherein N and M are positive integers, and N<M; obtaining a first varying parameter related to the first selected block according to the distribution of first pixel value range and the distribution of second pixel value range; and generating a first recognition signal when the first varying parameter is greater than a first threshold.

BRIEF DESCRIPTION OF THE DRAWINGS

The present disclosure will become more fully understood from the detailed description given hereinbelow and the accompanying drawings which are given by way of illustration only and thus are not limitative of the present disclosure and wherein.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

Figure 1:
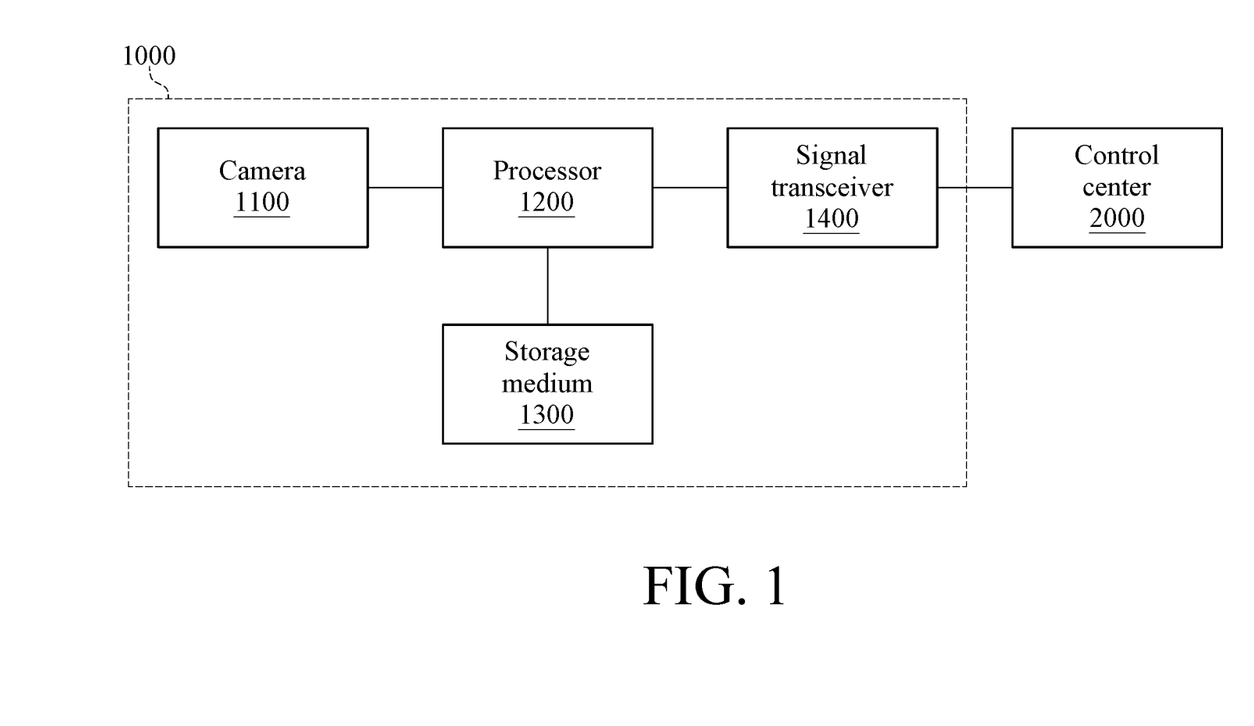
FIG. 1 is a schematic diagram of an image recognition device carrying out the method in the disclosure.

Please refer to FIG. 1. FIG. 1 is a schematic diagram of an image recognition device carrying out the method in the disclosure. An image recognition device 1000 includes a camera 1100, a processor 1200, a storage medium 1300, and a signal transceiver 1400. The processor 1200 is electrically connected to the camera 1100, the storage medium 1300 and the signal transceiver 1400. The above components work depending on the electricity of one or more batteries (not shown). The signal transceiver 1400 communicates with the control center 2000 in a wired or wireless manner.

In an embodiment, images captured by the camera 1100 are stored in the storage medium 1300 through the processor 1200; and the processor 1200 further acquires sequential images from the storage medium 1300 for the follow-up image recognition, and selectively enables the signal transceiver 1400 according to the result of image recognition so that the signal transceiver 1400 communicates with the control center 2000. In another embodiment, the processor 1200 directly processes images captured by the camera 1100 to obtain some data and results, and temporarily or permanently stores the data and results in the storage medium 1300. Here, the storage medium 1300 includes a non-volatile memory.

Figure 2:
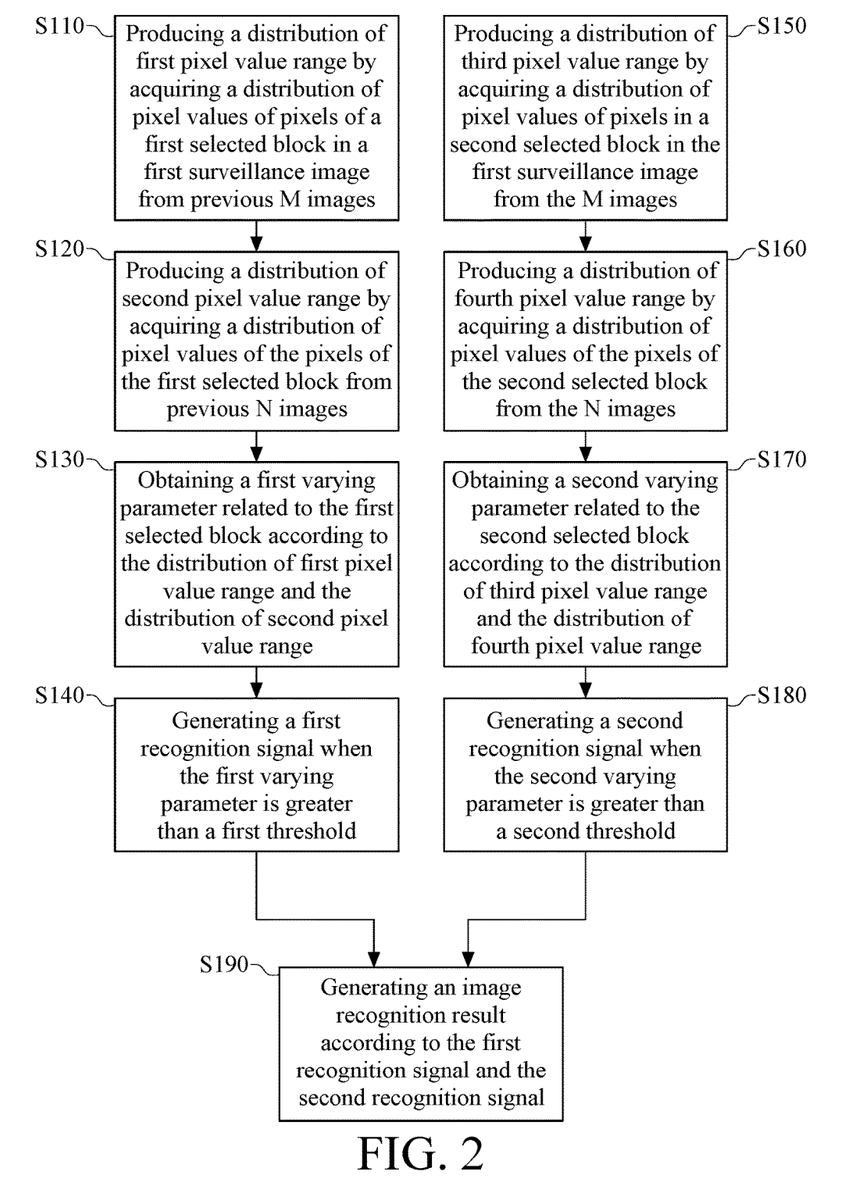
FIG. 2 is a flow chart of an image recognition method according to an embodiment of the disclosure.

When the camera 1100 has acquired a number of images or the storage medium 1300 has stored a number of images, the processor 1200 performs an operation, as shown in FIG. 2. FIG. 2 is a flow chart of an image recognition method according to an embodiment of the disclosure. As shown in FIG. 2, the image recognition method in this embodiment includes the following steps: in step S110, acquiring a distribution of pixel values of a number of pixels of a first selected block in a first surveillance image from previous M images and setting it as a distribution of first pixel value range; in step S120, acquiring a distribution of pixel values of these pixels of the first selected block from previous N images, and setting it as a distribution of second pixel value range, wherein N and M are positive integers, and N<M; in step S130, obtaining a first varying parameter related to the first selected block according to the distribution of first pixel value range and the distribution of second pixel value range; and in step S140, generating a first recognition signal when the first varying parameter is greater than a first threshold.

Figure 3:
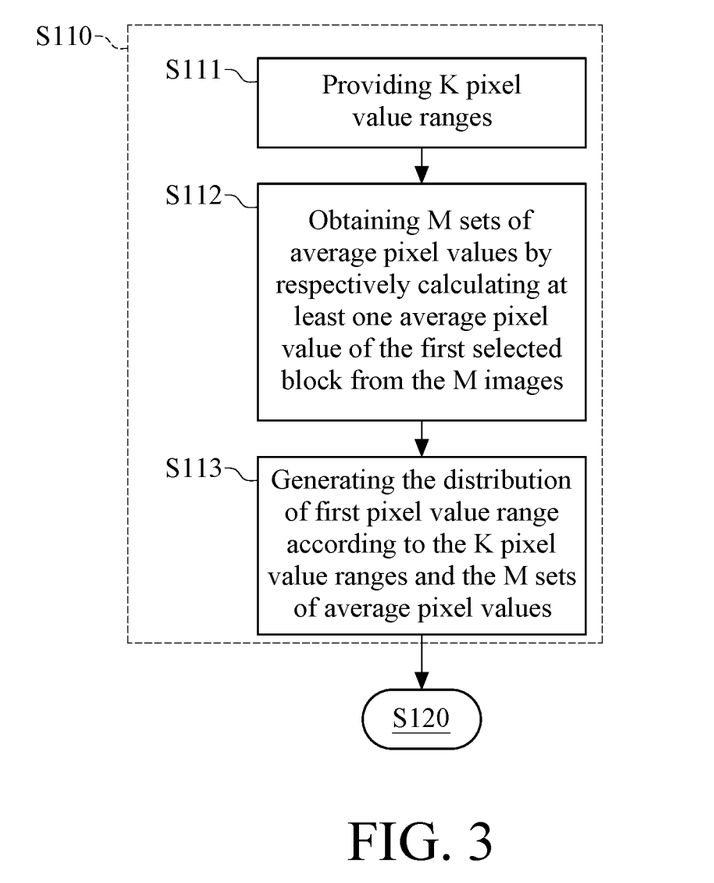
FIG. 3 is a flow chart of step S110 according to an embodiment of the disclosure.

Please refer to FIG. 3. FIG. 3 is a flow chart of step S110 according to an embodiment of the disclosure. As shown in FIG. 3, step S110 includes the following steps: in step S111, providing K pixel value ranges, wherein K is a positive integer greater than 1; in step S112, respectively calculating at least one average pixel value of the first selected block from the M images to obtain M sets of average pixel values; and in step S113, generating the distribution of first pixel value range according to the K pixel value ranges and the M sets of average pixel values.

coordinate value (Y) of a 2D Cartesian coordinate system in a CIE1931 color space. Moreover, the first coordinate value and the second coordinate value can be classified by the foregoing method.

Particularly, in step S112, if the first surveillance image is a grayscale image, the data of each pixel has only one channel (grayscale) and the processor 1200 will calculate an average of grayscales of pixels of the first selected block in each image. Step S113 is counting how many images their average grayscale falls in each range from previous M images. By a similar way, the distribution of second pixel value range in step S120 can be obtained. In an embodiment, this distribution is normalized, that is, is divided by the amount of all images, to obtain a value that is the probability of the average grayscale of the first selected block falling in each range.

TABLE 1

| Grayscale range | 0~31 | 32~63 | 64~95 | 96~127 | 128~159 | 160~191 | 192~223 | 224~255 |
|---|---|---|---|---|---|---|---|---|
| Distribution of first pixel value range | 0 | 0 | 1 | 63 | 62 | 2 | 0 | 0 |
| Normalized distribution of first pixel value range | 0 | 0 | 1/128 | 63/128 | 31/64 | 1/64 | 0 | 0 |
| Normalized distribution of second pixel value range (FIG. 4) | 0 | 0 | 1/16 | 7/16 | 1/2 | 0 | 0 | 0 |
| Normalized distribution of second pixel value range (FIG. 5) | 0 | 0 | 1/4 | 5/8 | 1/8 | 0 | 0 | 0 |

In the case of a grayscale system, each pixel typically has a grayscale ranging from 0 to 255. In an embodiment, the K pixel value ranges in step S111 are defined by evenly dividing the grayscale range. For example, if K is 8, a grayscale range from 0 to 31 is defined as a first pixel value range, a grayscale range from 32 to 63 is defined as a second pixel value range, and the other grayscale ranges can be deduced by analogy until the last grayscale range from 224 to 255 is defined as an eighth pixel value range. In another embodiment, the K pixel value ranges in step S111 are defined by unevenly dividing the grayscale range. For example, if it is known that the image recognition will be performed in the earlier morning or the afternoon, one or more hyper-grayscales (higher than 191) and one or more hypo-grayscales (lower than 64) will be omitted and the grayscale range from 64 to 191 is divided into eight equal parts.

Figure 4:
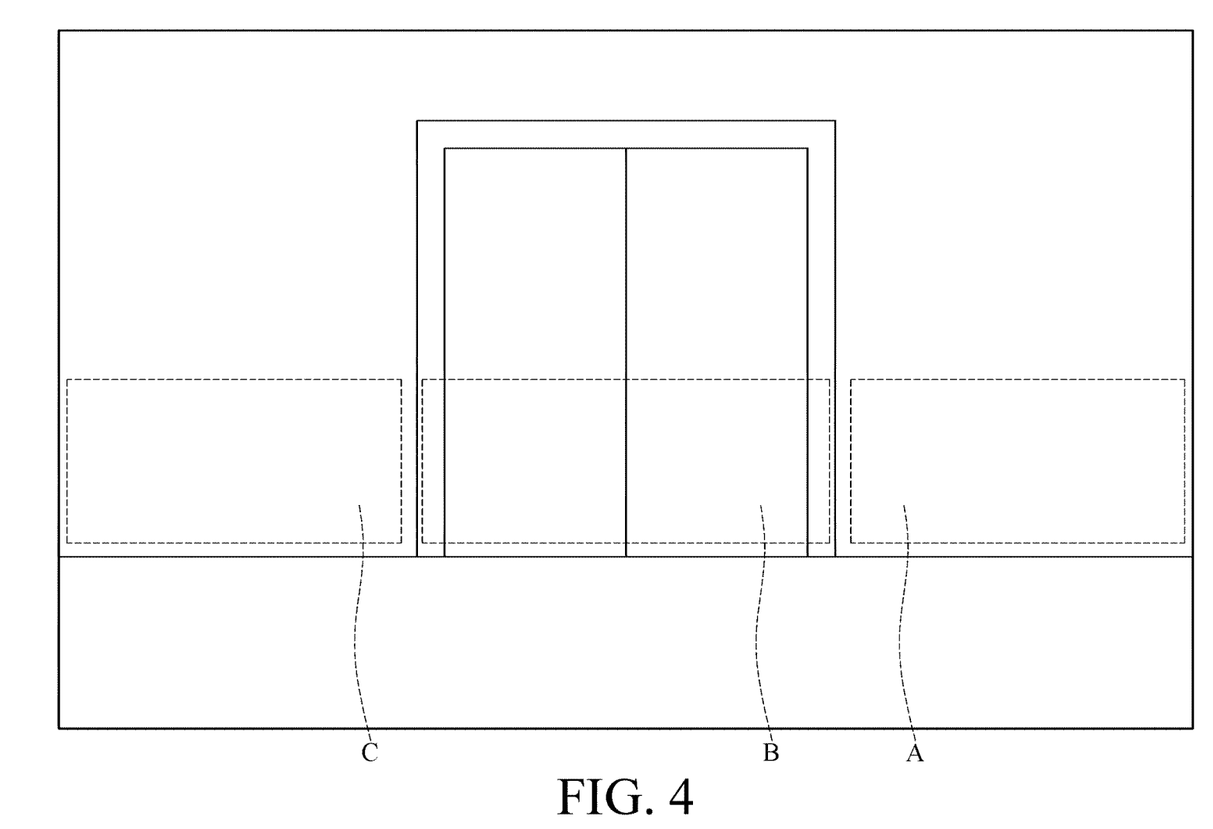
FIG. 4 exemplarily illustrates a surveillance image in an embodiment of the disclosure.
Figure 5:
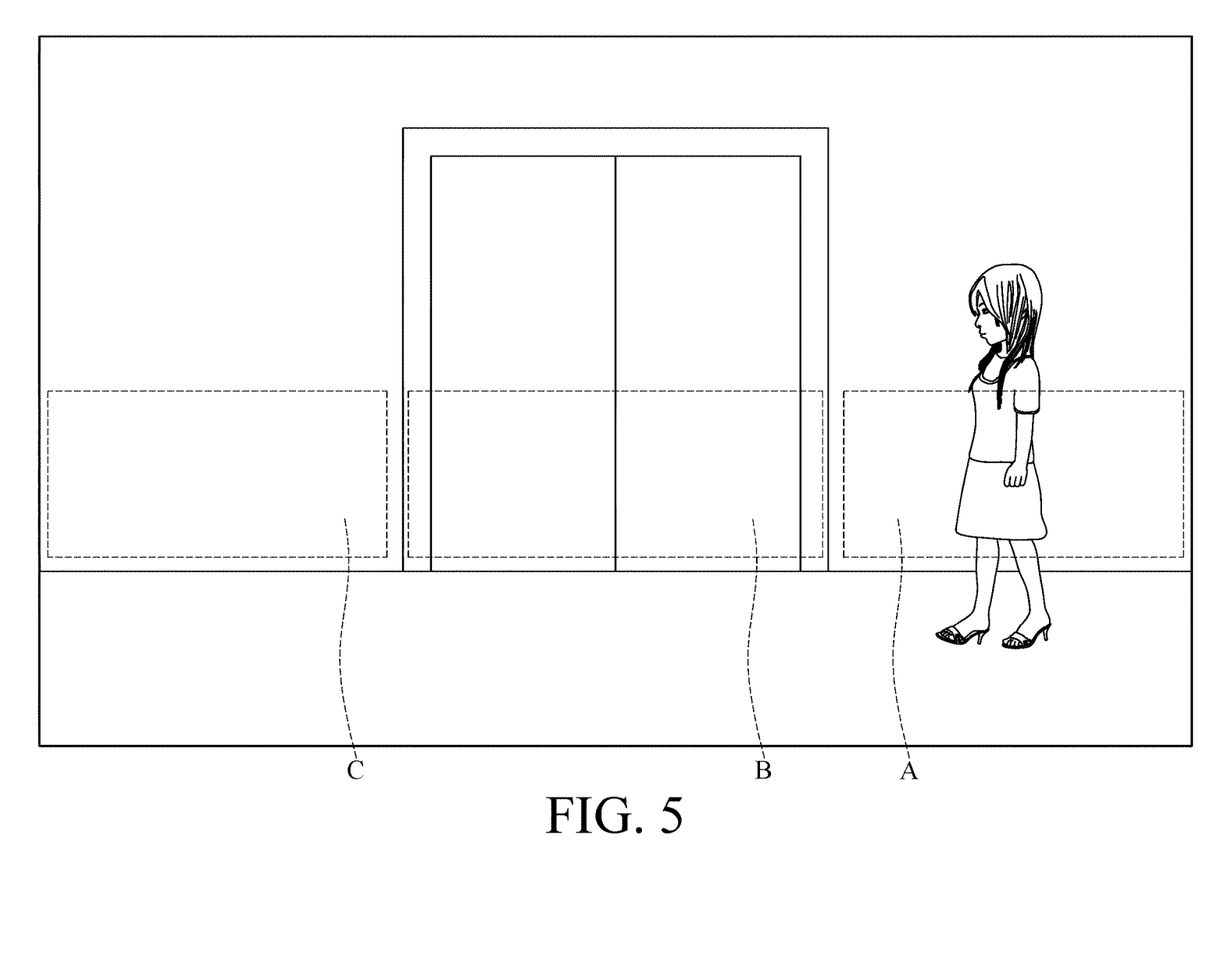
FIG. 5 exemplarily illustrates a surveillance image in an embodiment of the disclosure.
Figure 6:
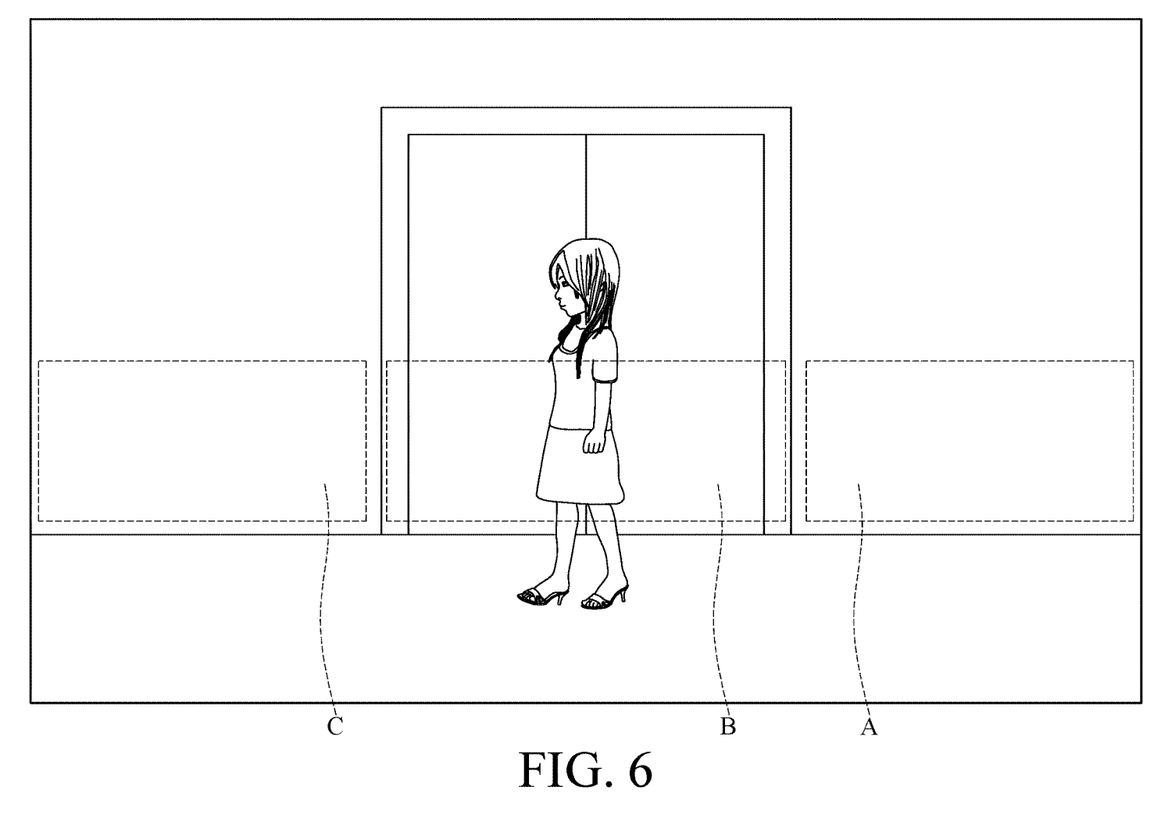
FIG. 6 exemplarily illustrates a surveillance image in an embodiment of the disclosure.
Figure 7:
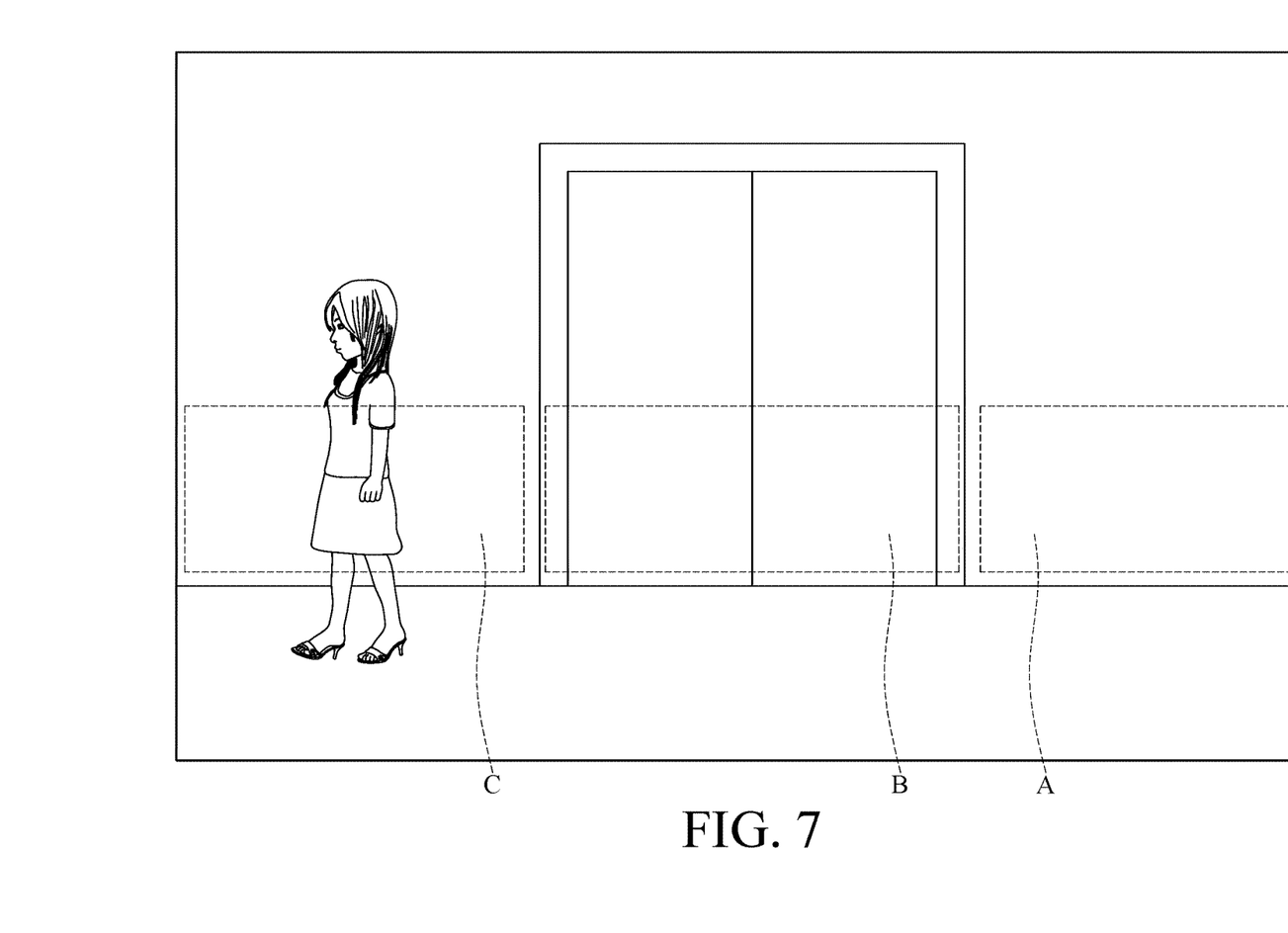
FIG. 7 exemplarily illustrates a surveillance image in an embodiment of the disclosure.

In the case of a color system of three primaries, red, green and blue (or RGB color model), each primary value ranges from 0 to 255. Therefore, the primary value range can be divided by the foregoing method related to grayscales. Moreover, there are other color spaces, such as CMYK and CIE1931, and the color corresponding to a respective pixel has a coordinate in the related color space, which can be obtained by transforming the RGB color system by any conventional method in the art, and the transformation method is no longer being described here. In the case of a CIE1931 color space, the mixed color of RGB primaries of each pixel has a first coordinate value (X) and a second Then, in an embodiment, obtaining the first varying parameter of the first selected block according to the distribution of first pixel value range and the distribution of second pixel value range in step S130 is carried out as follows. Please refer to Table 1, FIG. 4 and FIG. 5. FIG. 4 and FIG. 5 exemplarily illustrate a surveillance image in embodiments of the disclosure. Table 1 exemplarily illustrates the normalization result based on M=128, N=16, a grayscale image as the surveillance image, and a block A as the first selected block. The surveillance image is an image of a square in front of a warehouse in an open country, and when the surveillance image changes from FIG. 4 to FIG. 5, it denotes that there is a man appearing in the screen, and the distribution of pixels in the block A changes. Since M is greater, the distribution of first pixel value range does not almost change (slowly change). Since N is smaller, the distribution of second pixel value range changes fast from the distribution illustrated by the third raw to the distribution illustrated by the fourth row in Table 1. In an embodiment, the calculation of the first varying parameter D is expressed as follows:

$$D = \sum_{i=1}^{8} (p_{2,i} - p_{1,i})^2 \text{ or}$$

$$D = \sum_{i=1}^{8} |p_{2,i} - p_{1,i}|,$$

where $p_{2,1}$ represents a value in the first pixel value range (grayscale of 0 to 31) in the distribution of second pixel value range, namely the probability of the average grayscale of 0 to 31 (the number of times of appearing/16) of the first selected block from the previous N (16) images; and $p_{1,1}$ represents a value in the first pixel value range (grayscale of 0 to 31) in the distribution of first pixel value range, namely the probability of the average grayscale of 0 to 31 (the number of times of appearing/128) of the first selected block from the previous M (128) images. In step S140, when the first varying parameter D is greater than a first threshold (e.g. 1/8), the processor 1200 will generate a first recognition signal denoting that an object may appear in the block A.

If the surveillance image is based on a RGB color system, the calculation of the first varying parameter D is expressed as follows:

$$D = \begin{cases} D_R = \sum_{i=1}^{8} (p_{2,R,i} - p_{1,R,i})^2 \\ D_G = \sum_{i=1}^{8} (p_{2,G,i} - p_{1,G,i})^2 \\ D_B = \sum_{i=1}^{8} (p_{2,B,i} - p_{1,B,i})^2 \end{cases},$$

where $D_R$, $D_G$ and $D_B$ respectively represent a first red varying parameter, a first green varying parameter, and a first blue varying parameter. The other variables are exemplified in the formula of $D_R$, where $p_{2,R,1}$ represents the number of the first pixel value range (red brightness of 0 to 31) in the distribution of second pixel value range, namely the probability that the average of pixel values of red pixels of the first selected block is between 0 and 31 from the previous N images; and $p_{1,R,1}$ represents the number of the first pixel value range (red brightness of 0 to 31) in the distribution of first pixel value range, namely the probability that the average pixels values of red pixels of the first selected block is between 0 and 31 from the previous M images. In an embodiment, when a sum of the first red varying parameter, the first green varying parameter and the first blue varying parameter is greater than a first threshold, the processor 1200 will generate a first recognition signal. In another embodiment, all those who have ordinary skill in the art can freely design that when one or more than one of the three varying parameters is greater than the corresponding first red threshold, the corresponding first green threshold, and the corresponding first blue threshold, the processor 1200 will generate a first recognition signal indicating that an object may enter into the block A.

In another embodiment, when the surveillance image is captured at midnight or noon, it indicates that grayscale of each pixel is generally higher or lower; and thus, the dynamic range of the grayscale is smaller. For example, in the midnight, the grayscale of the block A may be between 0 and 127; however, once a man enters into the block A, lamp-light may be projected onto the ground or the wall of the warehouse so that the upper limitation of the grayscale may increase to 150 or greater than 150, and the dynamic range of the grayscale becomes larger. Therefore, the dynamic range can be set as the distribution of first pixel value range and the distribution of second pixel value range. Likewise, when a guy enters into the block A, relevant changes will occur to the median or variation coefficient of the grayscale of each pixel of the block A so that the distribution of first pixel value range and the distribution of second pixel value range can be calculated by a method similar to the process of step S111 to step S113. In other words, in the forgoing embodiments, once the difference (absolute value) between the distribution of second pixel value range and the distribution of first pixel value range exceeds the first threshold, the processor 1200 will generate a first recognition signal that may indicate that an object enters into the block A.

In another embodiment, as shown in FIG. 2, the method further includes: in step S150, obtaining the distribution of pixel values of a plurality of pixels of a second selected block in the first surveillance image from the previous M images and setting it as a distribution of third pixel value range; in step S160, obtaining the distribution of pixel values of the plurality of pixels of the second selected block from the previous N images and setting it as a distribution of fourth pixel value range; in step S170, obtaining a second varying parameter related to the second selected block according to a distribution of third pixel value range and a distribution of fourth pixel value range; in step S180, generating a second recognition signal when the second varying parameter is greater than a second threshold; and in step S190, generating an image recognition result according to the first recognition signal and the second recognition signal.

In the case of FIG. 4 to FIG. 7, when a human, car or animal enters into the scene presented by the surveillance image, the human, car or animal usually moves from one block to another one rather than stops and stays at the same block for a longer time. For example, there is a man passing right by a warehouse, as chronologically shown in FIG. 4, FIG. 5 and FIG. 6, and the processor 1200, by the foregoing method, senses that variations in image (the enter of an object) occur to the blocks A, B and C, and thus, outputs a first recognition signal corresponding to the block A and a second recognition signal corresponding to the block B in a time period (e.g. 5 seconds); and through the two recognition signals, the processor 1200 considers that an object enters into the scene presented by the surveillance image, and generates an image recognition result, e.g. someone invading. Such an image recognition result is sent from the processor 1200 to the control center 2000 through the signal transceiver 1400. Furthermore, another surveillance image, generated during a time period (e.g. 30 seconds) before the foregoing image recognition result is generated, is also sent to the control center 2000. In another embodiment, after a guy enters into the scene presented by the surveillance image, this guy may not keep going forward. For example, the surveillance image may not change for a time period after changing for the situation shown in FIG. 4 to the situation shown in FIG. 5. Therefore, the processor 1200 sends the surveillance image to the control center 2000 via the signal transceiver 1400 for image recognition while generating the first recognition signal. Optionally, the processor 1200 starts performs image recognition onto the surveillance image while generating the first recognition signal, in order to determine whether any unexpected object (human) appears; and if yes, an image recognition result will be generated.

In yet another embodiment, there is another surveillance device (second surveillance device) related to the surveillance device capturing the surveillance images in FIG. 4 to FIG. 7 and disposed on the way to the warehouse in an example, and if the two surveillance devices respectively send a recognition signal to the control center 2000 during a time period (1 minute), the control center 2000, according to the two signals, considers that someone is entering into or approaching the warehouse, and generates an image recognition result.

Figure 8:
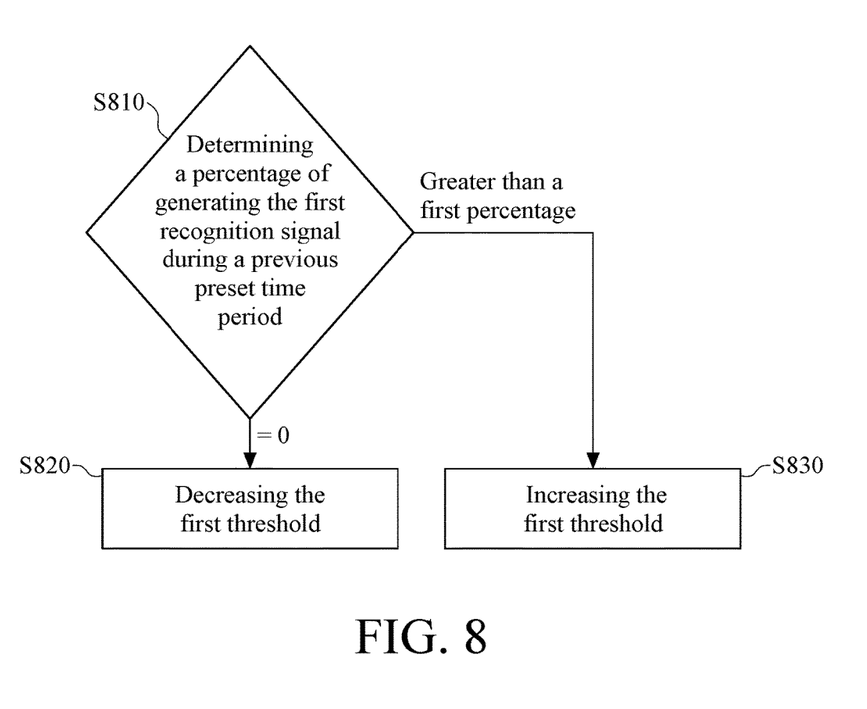
FIG. 8 is a flow chart of a method of adjusting a first threshold according to an embodiment of the disclosure.

The reason why set the first threshold is that the shadow of the surveillance device 1000 varies because of the wind and the variations in time and sunshine when the surveillance device 1000 is placed outside. Therefore, it is required to properly design the first threshold, so as to avoid misjudgment. To this end, the disclosure provides a method of adjusting the first threshold, and the method can be applied to the image recognition method in the disclosure. Please refer to FIG. 8. FIG. 8 is a flow chart of a method of adjusting a first threshold according to an embodiment of the disclosure. Step S810 is to determine the percentage of generating the first recognition signal during a previous preset time period (e.g. 5 minutes). When no first recognition signal is generated during the previous preset time period, it denotes that the first threshold is too high, resulting in that the image recognition method has too low sensitivity, and thus, the first threshold is decreased, as shown in step S820. When the number of times of or the percentage of generating a first recognition signal is greater than a first percentage period (e.g. 10 times or e.g. 3 times per minute) during the previous preset time, it denotes that the first threshold is too small, resulting in that the image recognition method has too high sensitivity, and thus, the first threshold is increased, as shown in step S830. Moreover, the first threshold can be decided according to time (day time or night time) or the brightness (grayscale) of the surveillance image. For example, no matter if a gray (black and white) surveillance image or a color surveillance image is used, variations in color and/or grayscale in the day time are more than that in the night time. Therefore, a greater first threshold is chosen in the day time or when the average brightness of an image is higher; and a smaller first threshold is chosen in the night time or when the average brightness of an image is lower.

The time length, the number of times, and the amount of any items exemplified in the disclosure are only for exemplary descriptions. The aforementioned camera can be any device capable of image capturing. The aforementioned storage medium can include one or more non-volatile memories (e.g. hard disk drive) and one or more volatile memories (e.g. random access memory). The aforementioned signal transceiver can be a signal receiving and transmission device for wired communication, optical communication or wireless transmission protocol. The foregoing processor can be a central processing unit (CPU), field-programmable gate array (FPGA) or other circuit device with the capability of computing. All those who have ordinary skill in the art can freely modify and combine the aforementioned examples and embodiments in view of the spirit of the disclosure without being limited by the embodiments of the disclosure.

What is claimed is:

1. An image recognition method, with the image recognition method performed by an image recognition device comprising a camera and a processor, and the image recognition method comprising steps of:

producing a distribution of first pixel value range by acquiring a distribution of pixel values of a plurality of pixels of a first selected block in a first surveillance image from previous M images;

producing a distribution of second pixel value range by acquiring a distribution of pixel values of the pixels of the first selected block from previous N images, wherein N and M are positive integers, and N<M;

obtaining a first varying parameter related to the first selected block by the processor according to the distribution of first pixel value range and the distribution of second pixel value range; and generating a first recognition signal by the processor when the first varying parameter is greater than a first threshold, wherein the step of producing the distribution of first pixel value range by acquiring the distribution of the pixel values of the pixels of the first selected block in the first surveillance image from the M images comprises:

providing K pixel value ranges, wherein K is a positive integer greater than 1;

obtaining M sets of average pixel values by respectively calculating at least one average pixel values of the first selected block from the M images; and generating the distribution of first pixel value range according to the K pixel value ranges and the M sets of average pixel values.

2. The image recognition method according to claim 1, further comprising steps of:

producing a distribution of third pixel value range by acquiring a distribution of pixel values of a plurality of pixels of a second selected block in the first surveillance image from the M images;

producing a distribution of fourth pixel value range by acquiring a distribution of pixel values of the pixels of the second selected block from the N images;

obtaining a second varying parameter related to the second selected block according to the distribution of third pixel value range and the distribution of fourth pixel value range;

generating a second recognition signal when the second varying parameter is greater than a second threshold; and generating an image recognition result according to the first recognition signal and the second recognition signal.

3. The image recognition method according to claim 1, wherein the step of producing the distribution of second pixel value range by acquiring the distribution of the pixel values of the pixels of the first selected block in the first surveillance image from the N images comprises:

obtaining N sets of average pixel values by respectively calculating at least one average pixel value of the first selected block from the N images; and generating the distribution of second pixel value range according to the K pixel value ranges and the N sets of average pixel values.

4. The image recognition method according to claim 3, wherein the step of obtaining the first varying parameter comprises:

calculating a square of a difference between a normalized number of the N sets of average pixel values and a normalized number of the M sets of average pixel values in an i-th pixel value range of the K pixel value ranges, and setting the square as i-th pixel variance, wherein i is a positive integer not greater than K; and generating the first varying parameter by calculating the K pixel variances.

5. The image recognition method according to claim 1, further comprising:

producing a distribution of third pixel value range by acquiring a distribution of pixel values of a plurality of pixels of a second selected block in a second surveillance image from previous X images;

producing a distribution of fourth pixel value range by acquiring a distribution of pixel values of the pixels of the second selected block from previous Y images, wherein X and Y are positive integers, and Y<X;

obtaining a second varying parameter related to the second selected block according to the distribution of third pixel value range and the distribution of fourth pixel value range;

generating a second recognition signal when the second varying parameter is greater than a second threshold; and generating an image recognition result according to the first recognition signal and the second recognition signal.

6. The image recognition method according to claim 1, wherein the first threshold is defined based on time.

7. The image recognition method according to claim 1, wherein when the first varying parameter is smaller than the first threshold during a preset time period, the first threshold is decreased.

8. The image recognition method according to claim 1, wherein when a percentage of the first varying parameter greater than the first threshold is greater than a first percentage during a preset time period, the first threshold is increased.

9. The image recognition method according to claim 1, further comprising:

determining whether any unexpected object appears, to generating an image recognition result by performing image recognition onto the first selected block in response to the first recognition signal.

10. The image recognition method according to claim 1, further comprising:

communicating with a control center according to the first recognition signal to send the first surveillance image to the control center.

* * * * *